Oct. 9, 1928.

W. W. MUIR 1,686,626

STIFFENING MEMBER FOR AUTOMOBILE RADIATORS

Filed Oct. 13, 1926

Inventor
W. W. Muir

Attorney

Oct. 9, 1928.
W. W. MUIR
1,686,626
STIFFENING MEMBER FOR AUTOMOBILE RADIATORS
Filed Oct. 13, 1926
2 Sheets-Sheet 2
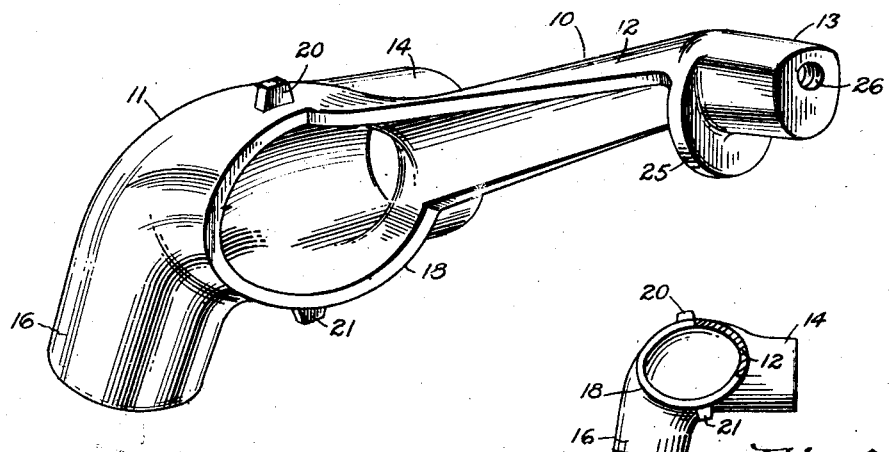
Fig. 4.
Fig. 7.
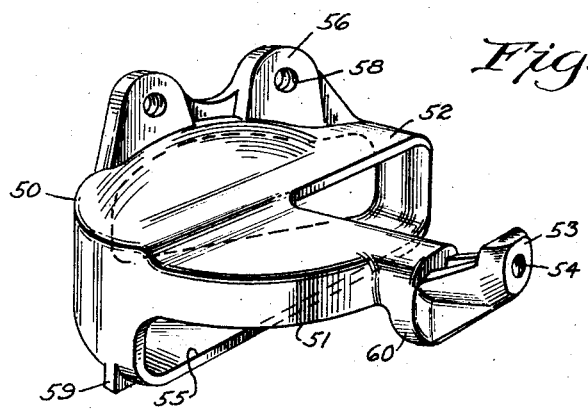
Fig. 5.
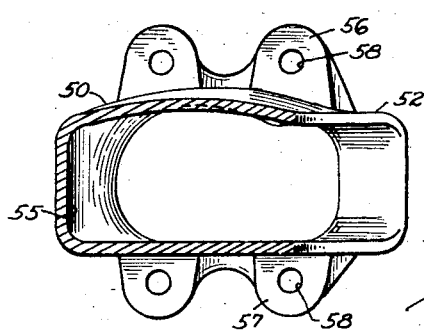
Fig. 8
Fig. 6.
Inventor
W. W. Muir
Attorney Patented Oct. 9, 1928.

1,686,626

UNITED STATES PATENT OFFICE.

WELLINGTON W. MUIR, OF LOCKPORT, NEW YORK, ASSIGNOR TO HARRISON RADIATOR CORPORATION, OF LOCKPORT, NEW YORK.

STIFFENING MEMBER FOR AUTOMOBILE RADIATORS.

Application filed October 13, 1926. Serial No. 141,318.

This invention relates to automobile radiator constructions and more particularly to a stiffening member therefor and has for its object to provide a device which will be simple in construction and more efficient in operation than those heretofore proposed.

With these and other objects in view the invention consists in the novel details of construction and combinations of parts as will be more fully hereinafter disclosed and particularly pointed out in the claims.

Referring to the accompanying drawings, forming a part of this specification and in which like numerals designate like parts in all the views:

Fig. 4 is a perspective view of the fitting forming the subject matter of this application;

Fig. 5 is a perspective view of a modified form of the invention;

Fig. 6 is a partial sectional view of a modification illustrated in Fig. 5;

Fig. 7 is a sectional view of the fitting taken as on the line 7—7 of Fig. 3 and looking in the direction of the arrows; and Fig. 8 is a sectional view of the fitting taken as on the line 8—8 of Fig. 3 and looking in the direction of the arrows.

Figure 1:
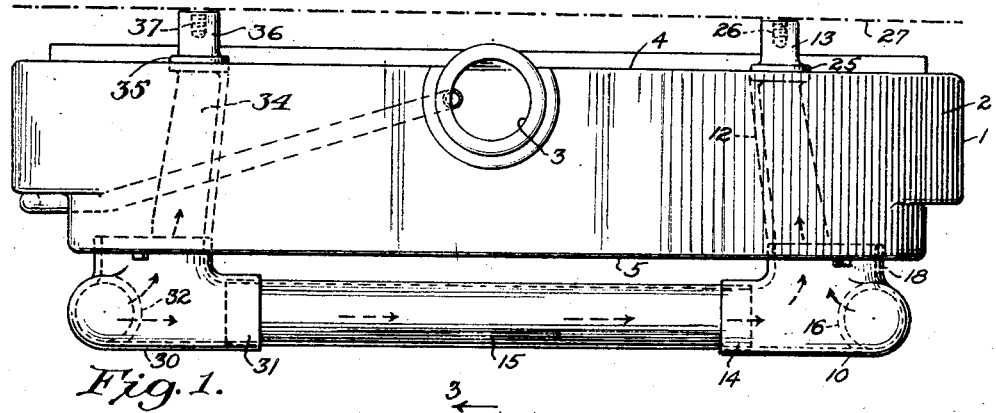
Fig. 1 is a top plan view of a radiator with this invention applied thereto.

As is well known, automobile radiator constructions are not of very great strength, and therefore said radiators are subject to damage. When damages occur, then there is a subsequent leakage of the fluid used for cooling the engine, with resultant possible damage to the engine from lack of sufficient quantities of the cooling fluid. It is therefore the purpose of this invention to reinforce or stiffen the radiator of an automobile, and particularly the upper portion thereof.

1 generally indicates the radiator of an automobile, having the upper tank portion 2 thereof, provided with the usual filler opening 3, and the front and rear walls 4 and 5 respectively.

Referring to Fig. 4, the numeral 10 represents generally a fitting, formed in a single casting, which is adapted to pass through the upper tank portion 2 of the radiator to stiffen the same and to particularly reinforce the front and back walls 4 and 5 respectively. This fitting comprises a rear portion 11, an intermediate portion 12, and a front portion 13. The rear portion 11 provides a tubular passageway for the cooling fluid, said portion consisting of one extension 14 adapted to receive one end of a fluid conducting pipe 15 in water-tight relation, and another extension 16 disposed angularly to said extension 14 and adapted to receive one end of a pipe connection 17 likewise in water-tight relation, said pipe 17 adapted to convey the cooling fluid from the engine (not shown) to the radiator. From the foregoing, and with particular reference to Fig. 1 it will be observed that the axes of the extensions 14 and 16, though angularly disposed to each other, lie in substantially the same plane, and this plane is substantially parallel to the rear wall 5 of the tank 2 when the fitting 10 is properly assembled. The extensions 14 and 16 are both connected to what may be termed a third extension 18, see Fig. 1, projecting toward the intermediate portion 12 of the casting 10. This extension 18 constitutes a passageway communicating with the said fluid passageways of the extensions 14 and 16, and is of suitable cross section and size to provide a smooth passageway for the cooling fluid.

The extension 18, provided with the oppositely disposed lugs 20 and 21, is adapted to pass through the rear wall 5 of the tank 2, said lugs serving as an abutment for properly positioning the fitting with reference to said tank, all as will be clear from the drawings. Thus it will be seen that the hot cooling fluid from the engine can pass therefrom through the pipe 17, the extension 16 and the extension 18 into the tank 2 of the radiator where it will be cooled and returned to the engine by means not shown but readily understood.

Figure 3:
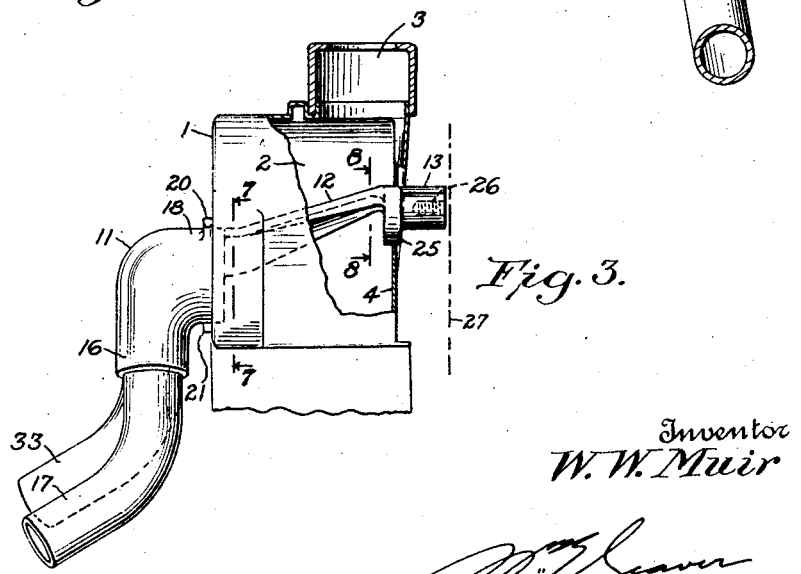
Fig. 3 is a fragmentary view taken as on the line 3—3 of Fig. 2 and looking in the direction of the arrow, showing the invention as seen from the side.

The extension 18 is integrally continued in part to form the intermediate portion 12 of the fitting, having at one end a cross section substantially one quarter that of the said extension 18, and while a general circular curvature of the intermediate portion is maintained, yet there is a reduction in size thereof from the relatively large elliptic shape at one end to the smaller circular shape at the other end, as clearly shown in Figs. 7 and 8. That is to say, the intermediate portion 12 extends upwardly and to one side of the axis of the elliptic extension 18 as clearly shown in Figs. 1, 3 and 4, and diminishes in dimension as by a taper, the forward end of the intermediate portion 12 integrally terminating in a substantially circular disk 25 disposed in a plane substantially parallel with the open end of the extension 18 and the plane of the axes of the extensions 14 and 16. This disk 25 is imperforate and is adapted to fit within an aperture therefor in the front wall 4 of the upper tank 2 of the radiator.

From the foregoing therefore it will be seen that the casting 10 is applied to the upper tank of the radiator by passing the forward portion 13 through an elliptic opening in the rear wall 5 of the tank, advancing the casting through said elliptic opening so that the forward end 13 will pass through a circular opening in the front wall 4 of said tank, adjusting the casting so that the extension 18 will lie within an elliptic opening in the rear wall 5 and the disk 25 will lie in a circular opening in the front wall 4, with the lugs 20 and 21 in facial contact with the rear wall 5, and then soldering, welding, or otherwise securing the casting 10 in this assembled position to prevent leakage of the cooling fluid through the openings in the front and rear walls of the upper tank 2. Inasmuch as the casting 10 is made of a suitable metal or alloy of comparative great strength, it will be seen that the upper tank structure of the radiator is rigidly reinforced.

Figure 2:
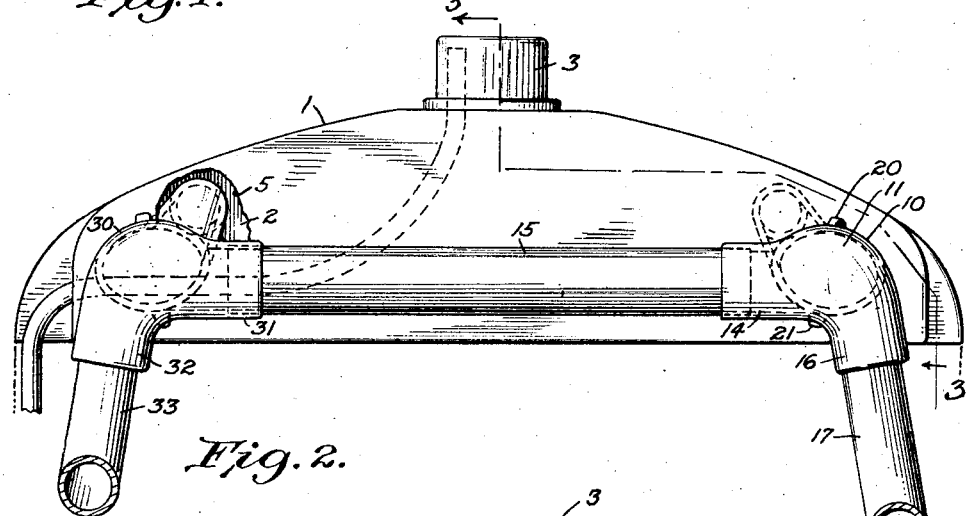
Fig. 2 is a rear elevational view of the upper portion of the automobile radiator to which the invention is applied.

The forward portion 13 of the said casting constitutes a lug which is of suitable dimensions to be tapped and threaded as at 26 to receive a threaded fastening means for securing to said lug any suitable or desired automobile attachment or accessory, such as a radiator shutter construction, represented by the dot and dash line 27 in Figs. 1 and 2. That is to say, the lug 13 has its forward facial extremity disposed in a plane which may be best suited for the reception of the particular device desired fastened to the casting 10, and in the drawings it has been illustrated as lying in a substantially vertical plane for the receipt and support of the shutter construction represented by said line 27.

The casting such as above described may, if desired, be made in rights and lefts as shown in the drawings for double connection with the cooling circuit of the automobile. That is to say, and with particular reference to Figs. 1, 2 and 3, there may be provided a second casting 30 exactly similar to the casting 10 except that it is a "left" where the casting 10 is a "right". In other words, the casting 30 is so formed that when assembled with the upper tank 2 of the radiator there is provided an extension 31 which is adapted to receive the other end of the pipe 15 in water tight relation. There is also provided a second extension 32 adapted to receive one end of a pipe 33 similar in all respects to the pipe 17 and which may lead to another portion of the cooling jacket of the automobile engine. The extensions 31 and 32 have their axes angularly disposed with relation to each other, but lying in a common plane which is substantially parallel with the rear wall 5 of the tank 2. The casting 30 likewise has an intermediate portion 34 which is the counter part of the intermediate portion 12 of the casting 10 and which is adapted to extend through the tank 2 and strengthen the same. This portion 34 likewise has integrally associated therewith at its forward end a disk 35 and a lug 36 tapped as at 37 to receive the fastening means for supporting the same or a different attachment or automobile accessory, but in the drawings shown as serving for the purpose of supporting the radiator shutter construction represented at 27.

From the foregoing it will thus be seen that by this invention there is provided a fitting which not only stiffens the upper tank 2 of the radiator, but serves to brace the entire radiator structure. That is to say, the fittings 10 and 30, together with the pipes 15, 17 and 33 rigidly secured thereto constitute a reinforcing frame which connects the upper tank 2 to the engine and overcomes undesirable lateral motion of the radiator. Also, besides stiffening the upper tank 2, and forming part of a brace for the radiator, the fittings 10 and 30 by their forwardly projecting lugs 13 and 36 make possible the connection to the radiator of coacting parts such as the radiator shutters, or other useful or necessary accessories.

In Figs. 5 and 6 is disclosed a modification of the fitting 10 which comprises a fitting 50 having the intermediate portion 51, a rear portion 52 and a forward extension comprising a lug 53 suitably tapped as at 54 to receive the radiator shutter construction or other necessary or useful accessory. The rear portion 52 comprises a substantially rectangularly shaped fluid passage 55 the rear extremity of which lies in a plane with flanges 56 and 57 suitably apertured and tapped as at 58 for the reception of means fastening said flanges to similar flanges, not shown, on the end of suitable pipe connections for the cooling fluid to the engine. The main body portion of the rear portion 52, is adapted to closely fit an aperture in the rear wall 5 of the upper tank 2, and lugs 59 are provided to limit the extent of the fitting 50 within said tank.

As clearly shown in Fig. 5 the intermediate portion 51, of substantially one quarter cross section of the passageway 55, extends forwardly and terminates integrally in a disk 60 in the same manner that the intermediate portion 12 of the fitting 10 terminated in the disk 25. Integral with the disk 60 is the lug 53 and when the fitting 50 is assembled in position with respect to the tank 2, the disk 60 will closely fit an aperture therefor in the front wall 4 of said tank. The entire fitting may be permanently secured to the tank by soldering, or welding as is the case with the fitting 10 to provide liquid-tight joints where said fitting passes through the walls of the tank.

It is obvious that those skilled in the art may vary the details of construction, as well as the arrangements of parts, without departing from the spirit of the invention, therefore it is not desired to be limited to the foregoing disclosure except as may be required by the claims.

What is claimed is:—

1. A fitting for automobile radiators provided with a tank, said fitting constituting means to stiffen said tank said fitting also having means to supply cooling fluid to said radiator, and means to support an element cooperating with said radiator.

2. A fitting for automobile radiators provided with a tank, said fitting provided with an intermediate portion constituting means to stiffen said tank without interfering with the inlet of cooling fluid thereto, said fitting also having a rear portion constituting means to supply cooling fluid to said radiator, and a front portion constituting means to support an element cooperating with said radiator.

3. A fitting for automobile radiators provided with a tank, said fitting adapted to pass through said tank and comprising a unitary structure constituting means to stiffen said tank as well as constituting means to supply cooling fluid to said radiator from a plurality of engine jacket outlets, and said fitting further constituting means to support an element cooperating with said radiator.

4. A pair of fittings for automobile radiators provided with a tank, each fitting constituting means to stiffen said tank at opposite sides thereof, as well as constituting means to supply cooling fluid to a plurality of locations in said radiator, and each fitting further constituting means to support an element cooperating with said radiator, both of said fittings adapted to be connected to the engine to constitute a brace for each side of said radiator.

5. A fitting for automobile radiators provided with a tank said fitting constituting means to stiffen the said tank, said fitting also having means to unrestrictedly supply cooling fluid to said radiator, as well as means to support an element cooperating with said radiator, said fitting adapted to be connected through said second named means to the engine to constitute a brace for said radiator.

6. A fitting for automobile radiators, provided with a tank, said fitting constituting curved means to stiffen the upper tank of said radiator, said fitting also having tubular means to supply cooling fluid to said radiator and apertured means adapted to support an element cooperating with said radiator.

7. A flangeless fitting for rapid assembly with automobile radiators provided with a tank having apertures in the front and rear walls thereof, said fitting adapted to pass through and be secured to the edge portion of said apertures, said fitting provided with an intermediate portion constituting means to stiffen said tank, said means adapted to freely permit the inlet of cooling fluid to said tank, and further provided with a branched rear portion constituting means to conduct the cooling fluid to said tank from a plurality of engine jacket outlets, and still further provided with a front portion apertured for the reception of an element cooperating with said radiator.

8. In combination with a tank for cooling fluid having apertures in the front and rear walls thereof, a device of the character described comprising a unitary structure adapted to be rigidly secured to the edge portion of said apertures to stiffen said walls, said structure extending beyond one of said walls and adapted to receive an element cooperating with said tank to vary the heat transfer thereof.

9. In combination with a tank for cooling fluid a device of the character described comprising a unitary structure adapted to pass through and be rigidly secured to opposite walls of said tank to stiffen the same, said structure extending beyond one of said walls and adapted to receive an element cooperating with said tank to vary the heat transfer thereof, as well as extending beyond the other thereof, and adapted to rigidly connect with a cooling fluid conducting element for bracing said tank.

10. A device of the character described comprising a forked fluid conducting portion, a reinforcing portion, and a supporting portion, the whole adapted for use in the transfer of heat from said fluid.

11. A fitting adapted for use in the transfer of heat from fluids, said fitting comprising an intermediate portion, a branched rear hollow portion for receiving the fluid and conducting a portion thereof to said intermediate portion, and a front apertured supporting portion, said intermediate portion integrally connecting the front and rear portions and adapted to directionally control the flow of fluid from said rear portion.

12. A fitting adapted to aid in the transfer of heat from fluids, said fitting comprising a rear portion adapted to convey said fluid in a plurality of directions, a front portion adapted to support an element further aiding in said heat transfer, and an intermediate portion joining said front and rear portions in offset alignment and adapted to limit the flow of fluid in one direction from said rear portion.

In testimony whereof I affix my signature.

WELLINGTON W. MUIR.